United States Patent [19]

Seibert et al.

[11] Patent Number: 4,750,788
[45] Date of Patent: Jun. 14, 1988

[54] BRAKE UNIT WITH SLIP CONTROL

[75] Inventors: Wofram Seibert, Pfungstadt; Norbert Ocvirk, Offenbach, both of Fed. Rep. of Germany

[73] Assignee: Alfred Teves GmbH, Frankfurt am Main, Fed. Rep. of Germany

[21] Appl. No.: 884,195

[22] Filed: Jul. 10, 1986

[30] Foreign Application Priority Data

Jul. 30, 1985 [DE] Fed. Rep. of Germany ....... 3527190

[51] Int. Cl.⁴ .......................... B60T 8/64; B60T 8/44; B60T 8/40
[52] U.S. Cl. ................................... 303/111; 303/114; 303/116; 303/119
[58] Field of Search ................ 303/92, 100, 110, 111, 303/113–117, 119; 180/197; 188/181 A

[56] References Cited

U.S. PATENT DOCUMENTS

| 4,509,802 | 4/1985 | Solleder et al. | 180/197 |
| 4,523,792 | 6/1985 | Belart et al. | 303/119 |
| 4,586,591 | 5/1986 | Belart | 303/119 X |
| 4,629,258 | 12/1986 | Resch et al. | 303/114 X |
| 4,641,895 | 2/1987 | Belart et al. | 180/197 |

FOREIGN PATENT DOCUMENTS

| 3338826 | 10/1983 | Fed. Rep. of Germany. | |
| 3137287 | 1/1984 | Fed. Rep. of Germany. | |
| 3403237 | 8/1985 | Fed. Rep. of Germany | 303/119 |
| 2148430 | 5/1985 | United Kingdom | 303/114 |

*Primary Examiner*—Andres Kashnikow
*Assistant Examiner*—Timothy Newholm
*Attorney, Agent, or Firm*—James B. Raden; Robert P. Seitter

[57] ABSTRACT

A hydraulic brake unit for automotive vehicles, with brake slip and traction slip control is furnished with a brake pressure generating assembly (1) with an auxiliary hydraulic pressure supply system comprising a hydraulic pump (5) and an auxiliary pressure modulation valve (6). On the start of the slip control action, an auxiliary hydraulic pressure is generated and the auxiliary pressure supply line (18) connected, instead of the brake pressure generating assembly (1), to the wheel brakes (12 to 15). By means of a 2/2-way valve being normally switched to free passage, the reflux path from the modulation valve (6) to the pressure balancing tank (7) can be shut off. In this manner an auxiliary pressure is generated also when the modulation valve (6) is not subject to any control action, by which auxiliary pressure a pressure can be generated in the wheel brakes (12 to 15) independently of whether a brake actuation takes place or not. The driven and the non-driven wheels are each decoupled from one another by a multiway valve (16, 17, 40, 41) in the phase of traction slip control action.

10 Claims, 2 Drawing Sheets

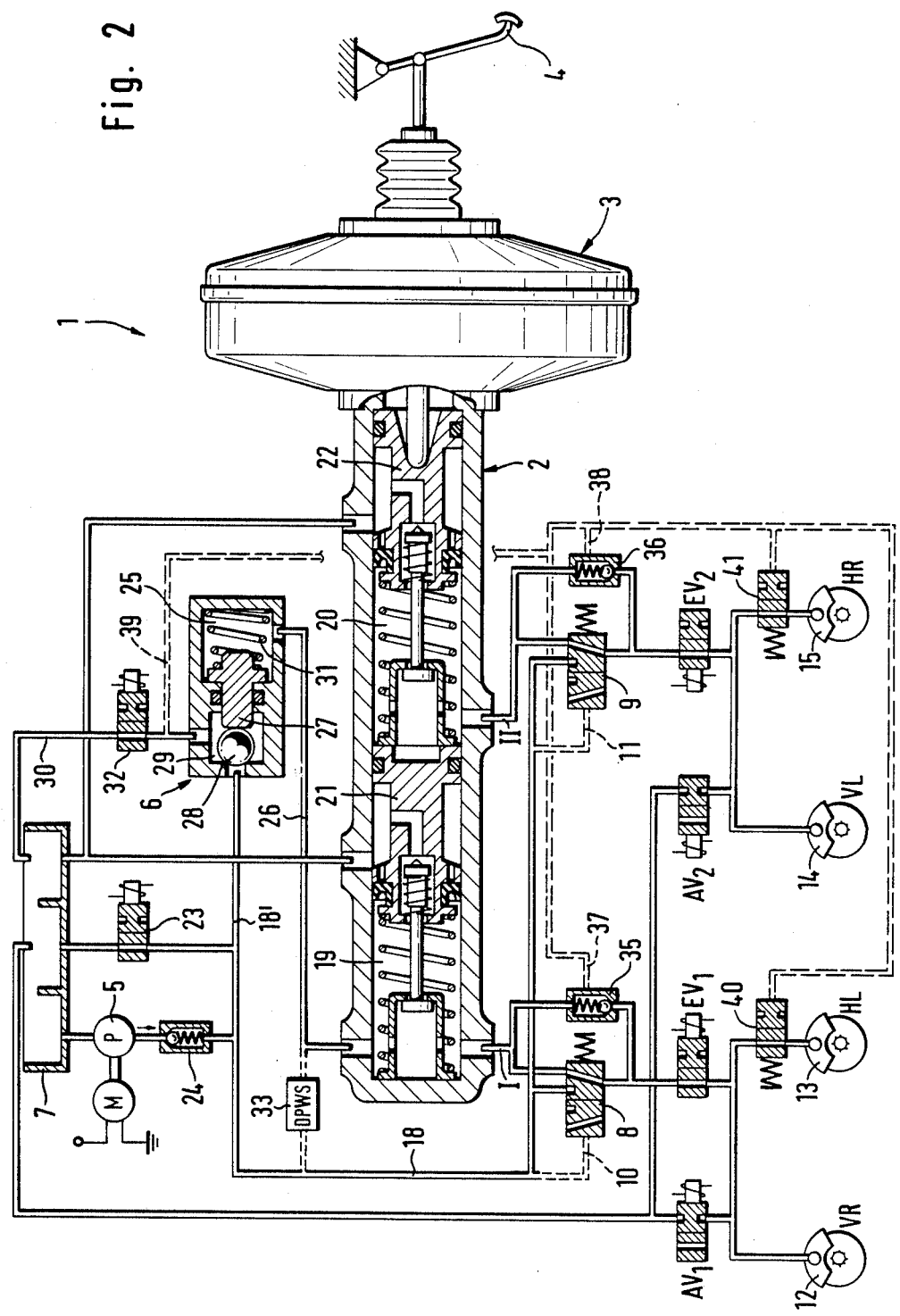

BRAKE UNIT WITH SLIP CONTROL

BACKGROUND OF THE INVENTION

This invention relates to a brake unit for automotive vehicles, with brake slip and traction slip control, and being equipped with a power-assisted brake pressure generating assembly with which the wheel brakes are connected through hydraulic fluid lines. The brake unit includes an auxiliary hydraulic pressure supply system comprising a hydraulic pump, an auxiliary pressure modulation valve controllable by the brake pressure generated in the brake pressure generating assembly, and a pressure balancing tank. In addition, valve arrangements are provided which are inserted in the hydraulic fluid lines leading to the wheel brakes succeeding the brake pressure generating assembly. The valve arrangements are switched to free passage in their normal position and upon commutation into a second switching position, link the auxiliary pressure supply system, in lieu of the brake pressure generating assembly, hydraulically to the wheel brakes. The brake unit is, furthermore, provided with wheel sensors and with electronic switching circuits for detection and monitoring of the rotational behaviour of the wheels and for the generation of electric brake pressure control signals by means of which electromagnetically actuatable brake pressure modulators are controllable for the purpose of slip control.

In German patent application No. P 35 02 451.8 a brake unit of this type is described which in one embodiment is comprised of a master cylinder with preceding vacuum booster. If and when locking of a wheel is imminent, a pressure is built up in the auxiliary hydraulic pressure supply system whose level is controllable, with the aid of the auxiliary pressure modulation valve, through the pressure existing in the power chamber of the master cylinder and being proportional to the pedal force. The auxiliary pressure leads to the commutation of multiway valves which in their normal position connect the power chambers of the master cylinder with the wheel brakes and upon commutation link the wheel brakes to the controlled auxiliary pressure instead of to the master cylinder. The brake pressure modulators controlled by the slip control are inserted in the hydraulic fluid paths between the described multiway valves and the wheel brakes, respectively between the wheel brakes and the balancing tank. It will be appreciated that in this manner the brake circuits of that brake unit are static in the event of non-controlled braking operation, whereas the brake pressure is supplied dynamically from the auxiliary pressure supply system on the start of the slip control action and upon the commutation of the multiway valves. When the control action starts, the exits of the master cylinder are shut off. It is ensured even in unfavorable conditions, in particular in the event of a strong pressure drop when driving on a slippery road surface as well as in the event of a failure of the auxiliary pressure supply, that sufficient hydraulic fluid remains at disposal in the master cylinder and, consequently, in the brake circuits.

The object of the present invention is to further develop a brake unit of this kind with a minimum of design efforts in such a manner that the brake unit is not only suited for the control of the brake slip but also for the control of the traction slip.

SUMMARY OF THE INVENTION

The object is achieved in a technically advanced manner and with but slight additional design and manufacturing efforts as compared with the unit according to the noted patent application in that a multiway valve is normally switched to free passage and is commutatable to shut-off action for the purpose of traction slip control. The multiway valve is inserted in the hydraulic fluid path leading from the hydraulic pump, by way of the auxiliary pressure modulation valve, to the pressure balancing tank, and any flux or reflux of hydraulic fluid into the brake pressure generating assembly is shut off during the traction slip control action. The wheel brakes of the driven wheels are separated hydraulically from the wheel brakes of the non-driven wheels.

As soon as the electronic system detects the risk of a racing of the wheels, respectively of an excessive traction slip by analyzing the rotational behaviour of the wheels, the hydraulic pump is switched in automatically and the multiway valve which is inserted in the hydraulic path going from said pump, by way of the auxiliary pressure modulation valve, to the pressure balancing tank will be switched over the shut-off action. Either by the auxiliary pressure or electromagnetically, the wheel brakes will be linked to the auxiliary pressure supply system and the exits of the brake pressure generating assembly will be closed. If the driven as well as the non-driven wheels are linked to a common brake circuit, then the two wheel brakes will moreover be decoupled hydraulically by locking the hydraulic fluid path leading to the non-driven wheel.

According to an advantageous embodiment of the invention, the multiway valve is located in the hydraulic fluid path going from the delivery side of the pump, by way of the auxiliary pressure modulation valve, to the pressure balancing tank is arranged between the modulation valve and the pressure balancing tank. The multiway valve is expediently designed as a 2/2-way valve and is actuatable electromagnetically.

Another embodiment of the present invention povides that the valve arrangements inserted succeeding the brake pressure generating assembly. The hydraulic fluid lines leading to the wheel brakes are configurated in the shape of pressure-controlled multiway valves which are commutatable by the auxiliary pressure and which in their normal position hydraulically connect the brake pressure generating assembly, and upon their commutation the auxiliary pressure supply system, connect with the wheel brakes. In this context, the commutation may also take place when the auxiliary pressure exceeds a predetermined threshold value.

Alternatively, the valve arrangements inserted in the lines going to the wheel brakes, downstream of the brake pressure generating assembly may be realized in the shape of electromagnetically actuatable multiway valves which in the de-energized condition connect the brake pressure generating assembly, and upon energization the auxiliary pressure supply system, connect with the wheel brakes.

Advantageously, the pressure-controlled and the electromagnetically actuatable valve arrangements may both be provided in the shape of 3/2-way valves.

For the purpose of a safe pressure reduction upon the release of the brake, a non-return valve lockable by pressure is arranged parallel to each of the valve arrangements. Each said non-return valve connects the hydraulic fluid path leading to the related wheel brakes with the brake pressure generating assembly and can open in the direction of the brake pressure generating assembly. The shutting-off of the non-return valve is effected by the auxiliary pressure which originates in the event of shutting-off of the multiway valve positioned between the modulation valve and the balancing tank.

In one embodiment of the present invention the brake pressure generating assembly is provided in the shape of a tandem master cylinder with preceding vacuum booster which is furnished with two hydraulically separate brake circuits to which the wheel brakes are connected diagonally. Each of the non-driven wheels allow decoupling from the driven wheel of one and the same brake circuit by switching over an electromagnetically actuatable 2/2-way valve which is open in the de-energized condition and through which the non-driven wheel is connected hydraulically.

In lieu of the electromagnetically actuatable valve, a pressure-controlled 2/2-way valve may be inserted, the pressure coming about, by action of the check valve, in the reflux from the modulation valve to the pressure balancing tank when the traction slip control action starts. In this configuration, it applied to these valves as a control pressure.

BRIEF DESCRIPTION OF THE DRAWING

Further features, advantages and applications of the present invention will now be described in conjunction with the accompanying drawing wherein.

Figure 1:
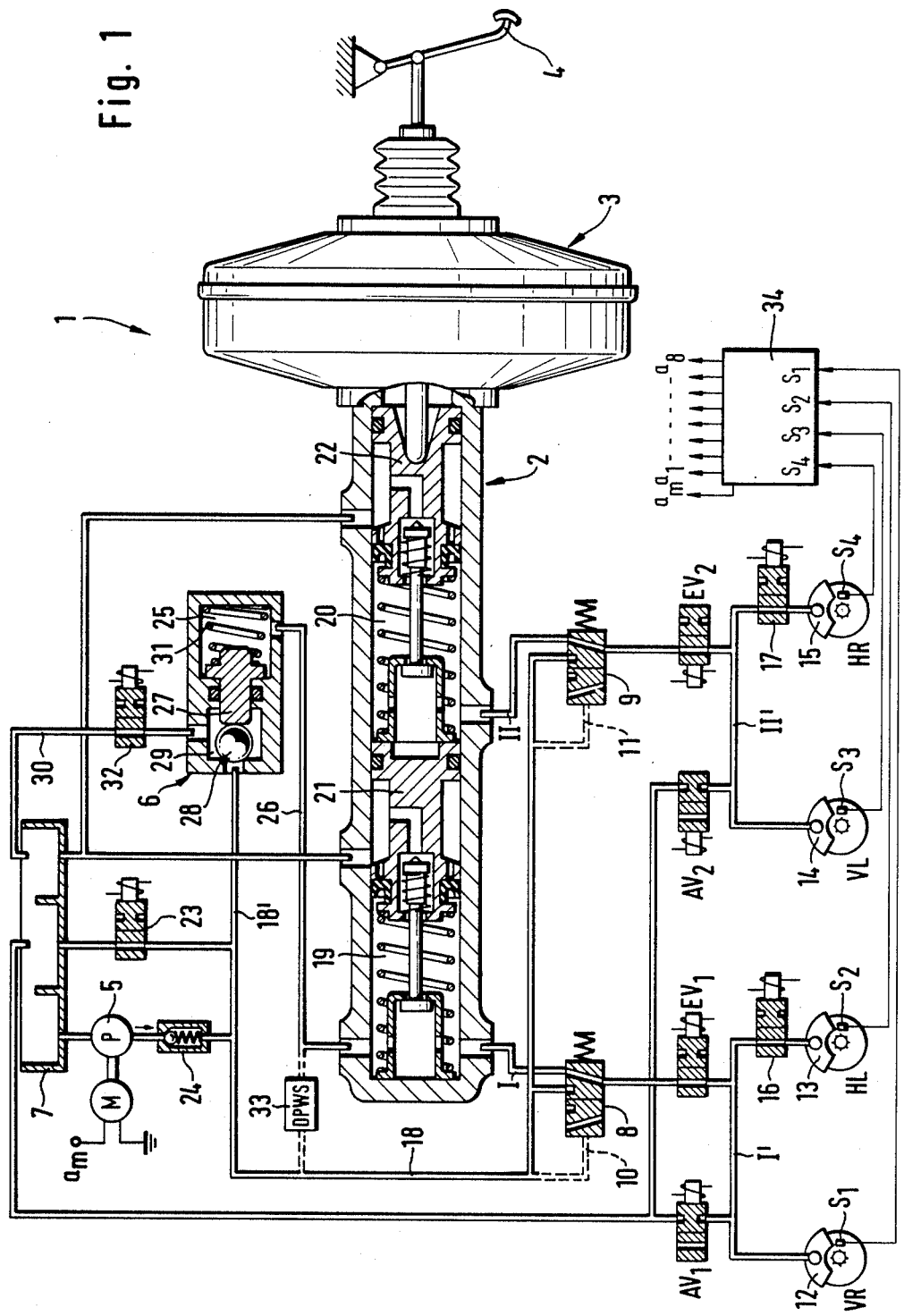
FIG. 1 is a diagrammatic representation of a brake pressure generating assembly and of the important components of a brake unit in accordance with the present invention and of their hydraulic and electric circuitry; and, FIG. 2 is another embodiment of the present invention in a representation as in FIG. 1.

In the embodiment illustrated in FIG. 1, brake unit of the present invention comprises a brake pressure generating assembly 1 which is composed of a tandem master cylinder 2 and a vacuum booster 3. The brake being actuated through a pedal 4.

In addition to the external energy required for the vaccum booster 3 which is taken in the known manner from a vacuum source (not shown), the brake unit is equipped with an auxiliary hydraulic pressure supply system which is needed exclusively for the slip control. The auxiliary pressure supply system is comprised of a hydraulic pump 5 which is driven by means of an electric motor M, of an auxiliary pressure modulation valve 6, and of a pressure balancing tank 7 which forms a constructional unit with the supply tank and hydraulic fluid reservoir required for operation of a customary master cylinder.

Furthermore, valve arrangements 8, 9 are provided which are provided in the shape of pressure-controlled 3/2-way valves in the embodiment illustrated in the drawing. In the initial position or normal position of rest of valves 8, 9, that is, as long as no control pressure at all or only a control pressure ranging below the point of commutation exists in the control lines 10, 11, valves 8, 9 connect the two brake circuits I, II of the tandem master cylinder 2 with the inlet valves $EV_1$, $EV_2$, by way of which the wheel brakes 12, 13; 14, 15, respectively of one diagonal are linked to brake circuits I, II, respectively. In each of the hydraulic fluid paths leading to the non-driven rear wheels HL, HR, still another 2/2-way valve 16, 17 is inserted which is switched to free passage in the normal position.

Upon the commutation of the valve arrangements 8, 9, instead of the master cylinder 2, that is, instead of the brake circuits I, II, an auxiliary pressure supply line 18 will be opened up toward the wheel brakes 12 to 15 through the inlet valves $EV_1$, $EV_2$. In this switching position, that is in the second switching position of the valve arrangements 8, 9, any efflux of hydraulic fluid from the power chambers 19, 20 will be rendered impossible, as a result whereof any further slide of the master cylinder pistons 21, 22 to the left and any drainage of the power chambers 18, 29 will be prevented.

A 2/2-way valve 23 switched to free passage in the normal position establishes a connection from the auxiliary pressure supply line 18 to the pressure balancing tank or reservoir 7, as a result whereof a reduction of the auxiliary pressure is safeguarded on the end of the control action and on switching back of that valve into the position illustrated. A reduction of the pressure by way of the pump is not possible because of a non-return valve 24 by way of which the pressure side of the pump 5 is linked to the supply line 18. The suction side of the pump is also linked to the joint pressure balancing tank or reservoir 7.

The auxiliary pressure modulation valve 6 contains a control chamber 25 which is connected, by way of a hydraulic fluid line 26, to one of the two power chambers of the master cylinder 2, namely to the power chamber 19 in the case illustrated in the drawing. The pressure existing in the control chamber 25 is transmitted, through a piston 27, to a ball-seat valve 28 which throttles the flow of hydraulic fluid from the pump 5, through the non-return valve 24, the connecting line 18', through a chamber 29 inside the modulation valve 6 and through a reflux line 30, to the balancing tank or reservoir 7 proportionally to the control pressure. When the brake is not actuated and the power chamber 19 is pressureless, the ball-seat valve 28 is practically open because a spring 31 inside the control chamber 25 defines the position of the piston 27 exclusively in the pressureless condition and exerts only a slight closing force on the ball-seat valve 28.

Furthermore, a 2/2-way valve 32 which is normally switched to free passage and is commutatable into a shut-off position and which is inserted in the reflux line 30 connecting the chamber 29 of the modulation valve 6 with the balancing tank or reservoir 7 is of vital importance for the brake unit according to the present invention. This check valve 32 is necessary in order to be able to bring about an auxiliary hydraulic pressure for traction slip control in the supply line 18, 18' when the brake is not actuated, the control chamber 25 is pressureless and, consequently, the ball seat-valve 28 is open. Certain defects of the brake unit can be be signalled with the aid of a pressure comparator switch 33 in conjunction with a warning device (not shown).

For the monitoring of the rotational behavior and for the detection of an imminent locking or of a racing tendency, the vehicle wheels are equipped with inductive sensors $S_1$, $S_2$, $S_3$, $S_4$ which furnish information in the shape of electric signals to an electronic switching circuit 34 supplying, upon recognition, logical operation and signal processing, control signals for the individual electromagnetically actuatable valves through its output lines $a_1$ to $a_8$. Through the connection $a_m$, the electric driving motor M of the hydraulic pump 5 will be switched in as soon as auxiliary hydraulic pressure is required for the purpose of slip control. In the illustrated embodiment of the invention, the inlet valves $EV_1$, $EV_2$, the outlet valves $AV_1$, $AV_2$ needed for the pressure reduction, the valve 23 safeguarding the pressure balance, and, finally the valves 16, 17 and 32 which are necessary for the traction slip control are actuated electromagnetically.

The brake unit according to FIG. 1 functions as follows: As long as neither a brake slip nor a traction slip control action is required, all valves except for the valves inside the master cylinder 2 remain in the position illustrated. The hydraulic pump remains out of functioning. The system works as a customary master cylinder with integrated vacuum booster.

The brake slip control action will start as soon as a wheel threatens to lock during a braking operation. For this purpose, the drivng motor M will be switched in through the switching circuit 34. The chamber 25 of the modulation valve 6 will be under pressure at this moment. An auxiliary pressure proportional to the pedal force will originate in the auxiliary pressure supply line 18 which will lead to the commutation of the valve arrangements 8 and 9 in the manner described, as a result whereof the auxiliary pressure supply system instead of the master cylinder 2 will be connected to the wheel brakes 12 to 15. Maintenance of the pressure at a constant level and a pressure reduction in the course of a brake pressure control procedure will now be subject to the control with the aid of the pairs of inlet and outlet valves $EV_1$, $AV_1$; $EV_2$, $AV_2$ which receive electric control signals through the output ends of the switching circuit 34.

If and when, however, with the brake not being operated or independent of the operation of the brake, a traction slip control action becomes necessary, which will be noticeable with the aid of the electronic switching circuit 34 from the rotatinal behaviour of the individual wheels and from the relevant sensor signals, then auxiliary hydraulic pressure will be generated again in that the driving motor M of the pump 5 is put into operation by means of a signal at the output end $a_m$ and the multiway valve 32 in the reflux line 30 is switched over electromagnetically. Also in this case, the pressure-controlled valve arrangements 8 and 9 will connect the auxiliary pressure supply line 18, instead of the brake circuits I, II, with the hydraulic fluid lines I', II' leading to the wheel brakes. In this instance, the hydraulic fluid path to the non-driven wheels HL, HR will be interrupted by energization and commutation of the valves 16, 17, so that only the wheel brakes 12, 14 will be subjectable to hydraulic brake pressure in the phase of traction slip control action. The pressure is proportioned and its course predetermined through the pairs of inlet and outlet valves $EV_1$, $AV_1$; $EV_2$, $AV_2$.

The components required for the brake slip control, in particular the auxiliary hydraulic pressure supply system, the pressure-controlled valve arrangements and the pairs of inlet and outlet valves, are, thus, utilized also for the traction slip control. The two separating valves 16, 17 are additional which are disposed in the hydraulic fluid paths leading to the non-driven wheels, and the separating valve 32 in the reflux line 30 between the auxiliary pressure modulation valve 6 and the balancing tank or reservoir 7. Accordingly, the added expenditure required to supplement the system to form a brake slip plus traction slip control system is very low.

The pressure-controlled valve arrangements, that is, the 3/2-way valves 8 and 9 may, by alternative, be substituted with corresponding valves being actuatable elecromagnetically. This will provide the advantage that the commutation of the valves can be rendered dependent on still other conditions in a very simple manner. For example, electric signals are very easily incorporated into logic circuits.

The brake unit according to FIG. 2 differs in only minor features from the unit described above. An explanation of the components and details coinciding with FIG. 1 is, therefore, avoided. identical components are designated by identical reference numerals in both Figures.

According to FIG. 2, non-return valves 35, 36 are disposed parallel to the valve arrangements 8, 9, non-return valves 35, 36 each linking the inlet of the inlet valve $EV_1$, respectively $EV_2$ to the pertaining conneciton of the brake circuit I, respectively II at the tandem master cylinder 2. The non-return valves will ensure a pressure reduction through the master cylinder 2 toward the balancing tank or reservoir 7 on the release of the brake.

As a additional feature, non-return valves 35, 36 have a control input end 37, 38 through which they can be shut off by applying to them a control pressure. Such shutting-off is necessary for the traction slip control, since the brake is not actuated in this phase and, therefore, the master cylinder 2 remains pressureless.

The control pressure to shut off the non-return valves 35, 36 is tapped off at the chamber 29 of the auxiliary pressure modulation valve 6 or from the hydraulic fluid path between the modulation valve and the multiway valve 32 switched over into the shut-off position in the phase of traction slip control action.

In the latter embodiment the 2/2-way valves 40, 41 can be provided as pressure-controlled valves, by means of which the respective non-driven wheel allows to be decoupled hydraulically from the driven wheel positioned in the same brake circuit. Indeed, pressure will exist at the tap 39 of the control pressure only during the phase of traction slip control action because the connection to the pressure balancing tank or reservoir 7 will be open in the event of normal braking operations and in the event of a brake slip control action.

We claim:

1. A brake unit with brake slip and traction slip control, with a power-assisted brake pressure generating assembly comprising a tandem master cylinder with a preceeding vacuum booster; and with two hydraulically separate brake circuits (I, I', II, II') to which driven and non-driven wheel brakes (12 to 15) are connected diagonally through hydraulic fluid lines, wherein each of said non-driven wheels is decouplable from the driven wheel of the one and the same brake circuit by commutation of a 2/2 way separating valve which is located in the hydraulic fluid line leading to the wheel brake of the non-driven wheel and which is open in a basic position; and with an auxiliary hydraulic pressure supply system comprising a hydraulic pump, an auxiliary pressure modulation valve and a pressure balancing tank, with valve arrangements being inserted in said hydraulic fluid lines leading to said wheel brakes and succeeding said brake pressure generating assembly, said valve arrangements being switched to free passage in their normal position and upon commuting into a second switching position which links said auxiliary pressure supply system, in lieu of said brake pressure generating assembly, hydraulically to said wheel brakes, and with wheel sensors and electronic switching circuits for detection and monitoring of the rotational behavior of the wheels and for the generation of electric brake pressure control signals by means of which brake pressure modulators comprising pairs of valves actuatable electromagnetically for the purpose of slip control are controllable, wherein in a multiway valve (32) being normally switched to free passage and being commutatable to shut-off action for the purpose of traction slip control is inserted in the hydraulic fluid path (18', 30) leading from said hydraulic pump (5), by way of said auxiliary pressure modulation valve (6), to said pressure balancing tank (7), and wherein during the traction slip control action, any flux or reflux of hydraulic fluid into said brake pressure generating assembly (1) is shut off by the commutation of said multiway valve means and the wheel brakes (12,14) of the driven wheels (VR,VL) are separated hydraulically from the wheel brakes (13,15) of the non-driven wheels (HR,HL) by the commutation of the separating valves (16,17)

2. A brake unit as claimed in claim 1, wherein said valve arrangements (8,9) are inserted succeeding said brake pressure generating assembly (1) in the hydraulic fluid lines leading to the wheel brakes (12-15) and are pressure-controlled multiway valves which are commutatable by the auxiliary pressure and in their normal position hydraulically connect said brake pressure generating assembly (1), and upon their commutation said auxiliary pressure supply system (5,6,18), with the wheel brakes (12 to 15).

3. A brake unit as claimed in claim 2, wherein the commutation for the said multiway valves (8, 9) takes place as soon as the auxiliary pressure exceeds a predetermined threshold value.

4. A brake unit as claimed in claim 1, wherein said valve arrangements (8,9) inserted in the hydraulic fluid lines going to the wheel brakes (12 to 15) downstream of the said brake pressure generating assembly (1) are provided as multiway valves which in their normal position of rest connect said brake pressure generating assembly with the wheel brakes, and upon commutation connected said auxiliary pressure supply system with the wheel brakes.

5. A brake unit as claimed in claim 4, wherein said valve arrangements (8,9) are configured in the shape of three-position valves with the capability of alternately directing brake pressure fluid to said wheels brakes, halting the flow of brake fluid to said wheel brakes, and directing pressure fluid from said wheel brakes to said pressure balancing tank.

6. A brake unit as claimed in claim 5, wherein a non-return valve (35,36) lockable by pressure is arranged parallel to each of said valve arrangements (8,9), each said non-return valve (35,36) connecting the hydraulic fluid path leading to the related wheel brakes (12 to 15) with said brake pressure generating assembly (1), and being commutable to free passage in the direction of said brake pressure generating assembly (1).

7. A brake unit as claimed in claim 6, wherein said non-return valve (35,36) is shut off by the auxiliary pressure which originates in the event of locking of said hydraulic fluid path (18',30) leading by way of said auxiliary pressure modulation valve (6).

8. A brake unit as claimed in claim 7, wherein said multiway valve means (32) which is inserted in the said hydraulic fluid path (18',30) leading from the hydraulic pump (5) through said auxiliary pressure modulation valve (6) to said pressure balancing tank (7) is provided as an electromagnetically actuatable 2/2-way valve which is open in the de-energized condition.

9. A brake unit as claimed in claim 8, wherein said separating valves are electromagnetically actuated.

10. A brake unit as claimed in claim 1, wherein said separating valves are commutatable into their shut-off positions by the pressure originating when the hydraulic fluid path (30) from said auxiliary pressure modulation valve (6) to the said pressure balancing tank (7) is locked upon the start of the traction slip control action.

* * * * *